United States Patent
Felderhoff et al.

(10) Patent No.: US 12,544,711 B2
(45) Date of Patent: Feb. 10, 2026

(54) PROCESS FOR REMOVING CARBON MONOXIDE FROM HYDROGEN GAS AND/OR ALIPHATIC HYDROCARBONS

(71) Applicant: STUDIENGESELLSCHAFT KOHLE MBH, Muelheim (DE)

(72) Inventors: Michael Felderhoff, Essen (DE); Kateryna Peinecke, Muelheim an der Ruhr (DE); Bodo Zibrowius, Muelheim (DE); Sun Tai, Guangdong (CN)

(73) Assignee: STUDIENGESELLSCHAFT KOHLE MBH, Muelheim (DE)

( * ) Notice: Subject to any disclaimer, the term of this patent is extended or adjusted under 35 U.S.C. 154(b) by 961 days.

(21) Appl. No.: 17/631,751

(22) PCT Filed: Jul. 26, 2020

(86) PCT No.: PCT/EP2020/071066
§ 371 (c)(1),
(2) Date: Jan. 31, 2022

(87) PCT Pub. No.: WO2021/018809
PCT Pub. Date: Feb. 4, 2021

(65) Prior Publication Data
US 2022/0266195 A1    Aug. 25, 2022

(30) Foreign Application Priority Data
Jul. 30, 2019   (DE) .................. 10 2019 211 379.6

(51) Int. Cl.
*B01D 53/48*    (2006.01)
*B01D 53/62*    (2006.01)
(Continued)

(52) U.S. Cl.
CPC ............ *B01D 53/48* (2013.01); *B01D 53/62* (2013.01); *B01D 53/8603* (2013.01);
(Continued)

(58) Field of Classification Search
CPC .... B01D 53/48; B01D 53/62; B01D 53/8603; B01D 53/864; B01D 2256/16;
(Continued)

(56) References Cited

U.S. PATENT DOCUMENTS

2004/0247521 A1   12/2004   Bogdanovic et al.
2014/0295301 A1   10/2014   Ebbesen et al.
2017/0298281 A1 * 10/2017   Weers ............... C10L 3/103

FOREIGN PATENT DOCUMENTS

CA    2915860 A1 *  6/2017   ............. B01D 53/48
EP    2 560 226 A1   2/2013

OTHER PUBLICATIONS

Balema et al. "Titanium catalyzed solid-state transformations in LiAlH4 during high-energy ball-milling". Journal of Alloys and Compounds 329 (2001) 108-114. (Year: 2001).*

* cited by examiner

*Primary Examiner* — Coris Fung
*Assistant Examiner* — Catriona M Corallo
(74) *Attorney, Agent, or Firm* — Norris McLaughlin, PA

(57) ABSTRACT

Disclosed is a process for removing carbon monoxide from a gas containing carbon monoxide, the gas being selected from hydrogen gas and/or one or more gaseous aliphatic hydrocarbons or a mixture thereof. The process comprises bringing the gas into contact with a complex metal aluminium hydride in a reaction vessel, wherein the metal aluminium hydride is selected from the group which consists of one or more compounds of Formula I $Me^{x+}[AlH_4]^-_x$ with x=1-5, of Formula II $Me_y^{w+}[AlH_6]^{3-}_z$ with w·y=3z, and of Formula III $Me_p^{q+}[AlH_5]^{2-}_r$ with p·q=2r, wherein Me represents one or more alkalis or alkaline-earth metals.

12 Claims, 3 Drawing Sheets

Figure 1:
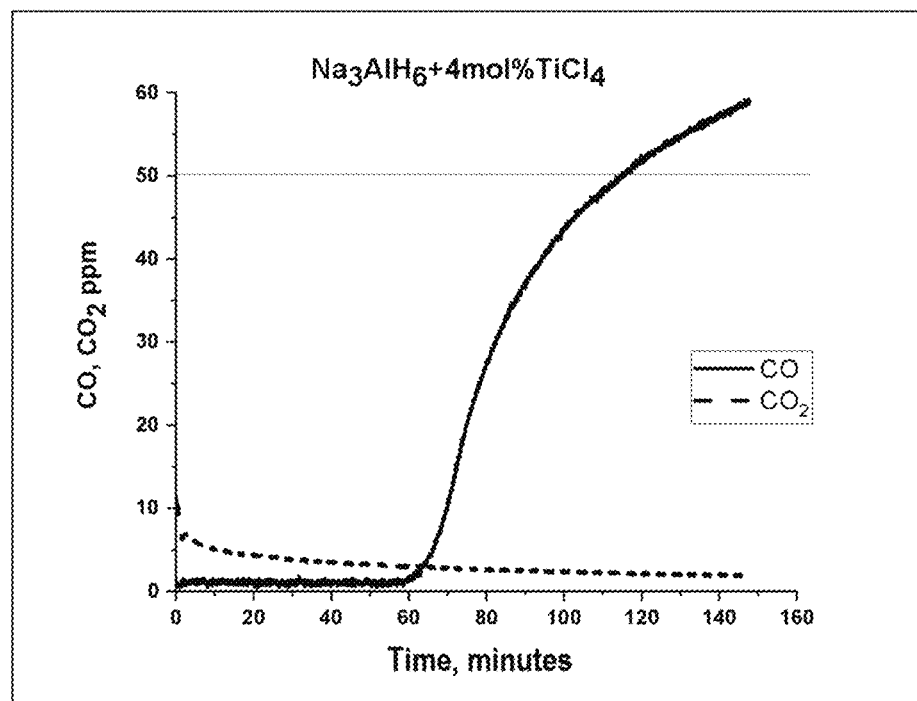
Figure 2:
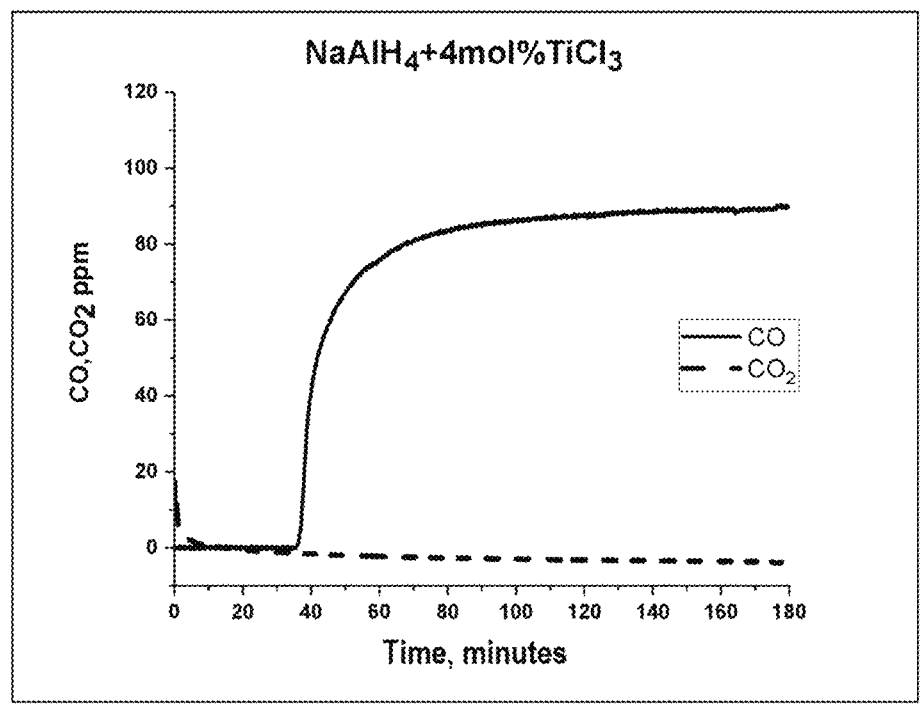
Figure 3:
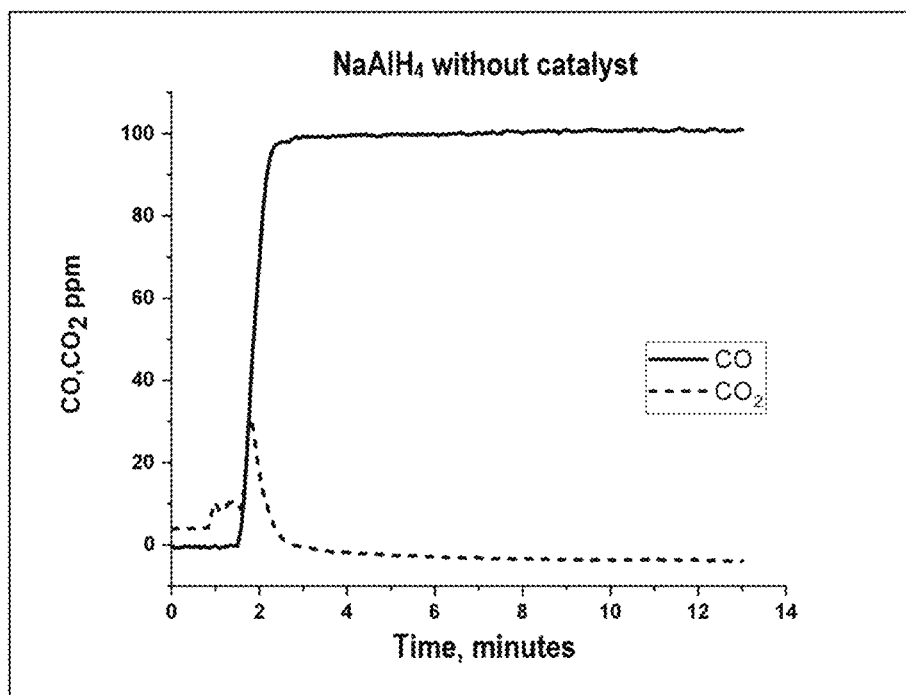

(51) Int. Cl.
 *B01D 53/86* (2006.01)
 *H01M 8/0662* (2016.01)
 *H01M 8/0668* (2016.01)
(52) U.S. Cl.
 CPC ........ *B01D 53/864* (2013.01); *H01M 8/0668* (2013.01); *H01M 8/0675* (2013.01); *B01D 2256/16* (2013.01); *B01D 2256/24* (2013.01); *B01D 2257/30* (2013.01); *B01D 2257/502* (2013.01)
(58) Field of Classification Search
 CPC ............ B01D 2256/24; B01D 2257/30; B01D 2257/502; H01M 8/0668; H01M 8/0675
 USPC ...................................................... 423/242.1
 See application file for complete search history.

PROCESS FOR REMOVING CARBON MONOXIDE FROM HYDROGEN GAS AND/OR ALIPHATIC HYDROCARBONS

This application is a 371 of International Patent Application No. PCT/EP2020/071066, filed Jul. 26, 2020, which claims priority of German Patent Application No. 10 2019 211 379.6, filed Jul. 30, 2019, the disclosures of which patent applications are hereby incorporated herein by reference.

The present invention relates to a process for removing carbon monoxide and/or gaseous sulphur compounds from hydrogen gas and/or aliphatic hydrocarbons, preferably at low temperatures, with the aid of complex metal aluminium hydrides.

Hydrogen is the most important energy carrier for fuel cells. Of the six different types of fuel cell, the polymer electrolyte fuel cell has gained importance in recent years as a low temperature fuel cell. The polymer electrolyte fuel cell—PEFC—generally usually known as a PEM—works at operating temperatures of below 100° C.

A characteristic of the polymer electrolyte fuel cell is the thin, gas-tight, proton-conducting, solid polymer membrane acting as the electrolyte. This plastic skin has acid groups incorporated into it, i.e. the protons diffuse through the membrane from the anode to the cathode, as in all acid cells, where they recombine with oxygen ions to form water. The water content which is necessary for ion conduction in perfluorinated polymer membranes which are currently available (for example produced from NAFION®) means that the operating temperature has to be limited to a maximum of 100° C. The electrical contact from the electrodes to the bipolar plates is obtained via metal or carbon-containing current collectors. These current collectors have to be permeable to gases and liquids in order to enable inward transport of the reaction gases and outward transport of the water of reaction.

At the low temperatures, catalysts are necessary in order to provide a sufficient reaction rate for the electrochemical reaction. From a materials science viewpoint, the highly acidic nature of the membrane (comparable with sulphuric acid) requires the use of precious metal catalysts such as platinum or platinum alloys.

The precious metal catalysts and electrolytes used require the purity of the fuel gas is comparatively high. In this regard, only $H_2$ can be considered as a fuel gas.

The oxidizing agent is $O_2$, but in contrast to other fuel cells, it is also possible to operate with air; this broadens the application possibilities for PEFC considerably. In this regard, carbon monoxide (CO) is tolerated only in very small quantities of <0.2 ppm in accordance with the ISO standard 14687-2 because it, along with sulphur compounds, acts as a poison for catalysts.

Hydrogen is rarely in its pure form on Earth and therefore energy is expended in order to produce it. A production process which is frequently used in the industry is the steam reformation of natural gas or hydrocarbons from other sources. The hydrogen is extracted from the hydrocarbon chain step by step by means of the various reforming processes. By-products include carbon monoxide, oxides of nitrogen and sulphur dioxide.

When the gas produced by reforming is to be conducted into a low temperature fuel cell, carbon monoxide must first be removed from it. For thermodynamic reasons, carbon monoxide is also formed during reforming and, along with sulphur compounds, acts as a poison for the catalysts of the fuel cell. In prior art processes, purification is carried out in what is known as a water gas shift reactor as well as in a preferential oxidation reactor. However, these processes are fairly complicated, and there is therefore a need for a simplified process for the production of hydrogen gas or gaseous aliphatic hydrocarbons which have been freed from catalyst poisons such as CO or sulphur compounds.

The inventor has surprisingly discovered that carbon monoxide and/or gaseous sulphur compounds can be removed from the hydrogen gas and/or aliphatic hydrocarbons by means of a complex metal aluminium hydride. In the context of the invention, when the "removal" of carbon monoxide from hydrogen gas is mentioned, this mention is also applicable in the corresponding form for the removal of gaseous sulphur compounds from hydrogen gas and/or gaseous aliphatic hydrocarbons which are present as a mixture with a few ppm of CO in hydrogen gas and/or aliphatic hydrocarbons and which can be brought into contact with the complex metal hydride.

More precisely, the invention concerns a process for removing carbon monoxide and/or gaseous sulphur compounds from a gas containing carbon monoxide and/or gaseous sulphur compounds, in which the gas, selected from hydrogen gas and/or one or more gaseous aliphatic hydrocarbons or a mixture thereof, is brought into contact with a complex metal aluminium hydride in a reaction vessel, wherein the metal aluminium hydride is selected from the group which consists of one or more compounds of Formula I $Me^{x+}[AlH_4]^-_x$ with x=1-5, of Formula II $Me_y^{w+}[AlH_6]^{3-}_z$ with w·y=3z and of Formula III $Me_p^{q+}[AlH_5]^{2-}_r$ with p·q=2r, wherein Me represents one or more metals from the periodic table of the elements.

The reaction may be carried out in a vessel which is configured as a reaction vessel for a batchwise reaction, or preferably as a reaction vessel for a continuous reaction into which the gas to be purified is introduced, brought into contact with the complex metal aluminium hydride and conducted out of the reaction vessel after the reaction. In this manner, residual contents of CO or sulphur-containing compounds of less than 0.2 ppm are possible over a long period of time. This means that the reaction vessel can be constructed in the form of a perfusable filter unit which is filled with one or more complex metal aluminium hydrides of Formulae I to III. A perfusable filter unit of this type may advantageously be used as a filter cartridge, in particular upstream of fuel cells, in order to protect the catalyst from catalyst poisons in the hydrogen gas which is used.

In addition, a perfusable filter unit may have an indicator which displays the degree of loading of the filter unit and permits exchange in a timely manner. This subject matter of the invention also includes a corresponding fuel cell with at least one perfusable filter unit in accordance with the invention. When operating a fuel cell, the flow of gas can be diverted, as a function of the degree of loading of a first filter unit, to at least one second filter unit which is disposed "in parallel" to the flow of gas, so that continuous operation of the fuel cell is permitted. At the same time, the first filter unit can undergo a step for recycling the complex metal hydride.

Complex hydrides which are preferred in accordance with the invention are metal aluminium hydrides of the following Formulae I to III: $Me^{x+}[AlH_4]^-_x$ with x=1-5, $Me_y^{x+}[AlH_6]^{3-}_z$ with x·y=3z and $Me_y^{x+}[AlH_5]^{2-}_z$ with x·y=2z. In this regard, "Me" represents one or more of any alkali metals or alkaline-earth metals from the periodic table of the elements. The complex hydride used may be completely or only partially dehydrogenated. In accordance with the invention, the term "dehydrogenated" should be understood to mean that the hydrogen bonded to the metal has been removed from the metal hydride by carrying out dehydrogenation measures such as heating to the decomposition temperature, for example.

The complex hydrides cited above may be reacted with one or more metals as metallic compounds such as metallic salts, for example heterogeneous halides, or in fact as a metal in the form of particles, in order to increase the reactivity of the metal aluminium hydrides. Preferably, the metals used are transition metals from groups 3, 4, 5, 6, 7, 8, 9, 10, 11, in particular Sc, Ti, V, Cr, Mn, Fe, Co, Ni, Cu, Zn, Y, Zr, Nb, Mo, La, Ce, Pr and Nd, or alloys or mixtures of these metals with each other or with aluminium, or compounds of these metals, for example as a metal salt such as a metal halide, in the form of very small particles with a high degree of distribution, for example with particle sizes of approximately 10 nm to 1000 nm and/or with large specific surface areas, for example of 50 to 1000 m$^2$/g. In this regard, the aforementioned transition metals, and in this regard preferred metals such as Ti, Zr, Sc, Y and rare earth metals, are used. The metals may be produced in a variety of earlier steps, directly by in situ reduction with the complex metal hydride, or ex situ by the most widely differing reduction processes. In this regard, in situ production is preferred.

The complex hydride or the mixture of metal and complex hydride may be supplemented with additives such as carbon (graphite, nodular carbon, activated carbon) in particle form with a particle size of 10 nm to 1000 nm, or also metal powder such as Al powder with particle sizes of 10 nm to 1000 nm in order to obtain a good distribution of catalyst and complex hydride on the surface of the particle. In addition, the aforementioned complex hydrides used may have been partially oxidized. In this regard, oxidation is carried out by contact with oxygen (air), for example simply in air.

The inventors assume that upon contact of the CO with the metal hydride powder, a reaction occurs in which CO is at least partially reduced to $CH_4$ and/or is complexed with the metal, so that after perfusing/contact with the gas, no more carbon monoxide is present in the gas until the capacity of the complex metal hydride is exhausted.

In accordance with the invention, the CO-containing hydrogen gas is conducted over the metal hydride powder produced from complex hydride and catalyst in a reactor in continuous or also in batch mode and is therefore brought into contact therewith. Contact may also be carried out in a fluidized bed reactor, or indeed in a closed reaction vessel such as an autoclave. The flow rates of the CO-containing hydrogen gas in continuous operational mode are selected in a manner such that a complete reaction and adsorption occurs at the complex metal hydride, and as a rule is 1.5 L/hg (complex metal hydride).

The pressure in the reaction vessel is not critical and may be in the range from normal pressure to approximately 0.1 to 15 MPa. In accordance with the invention, as a rule the reaction temperature is between −20° C. and 250° C.

The invention will now be explained in more detail with the aid of the accompanying FIGS. 1 to 5 and the examples of production.

In this regard, FIGS. 1 to 4 show plots for experiments with the process in accordance with the invention compared with a process which is not in accordance with the invention.

Figure 4:
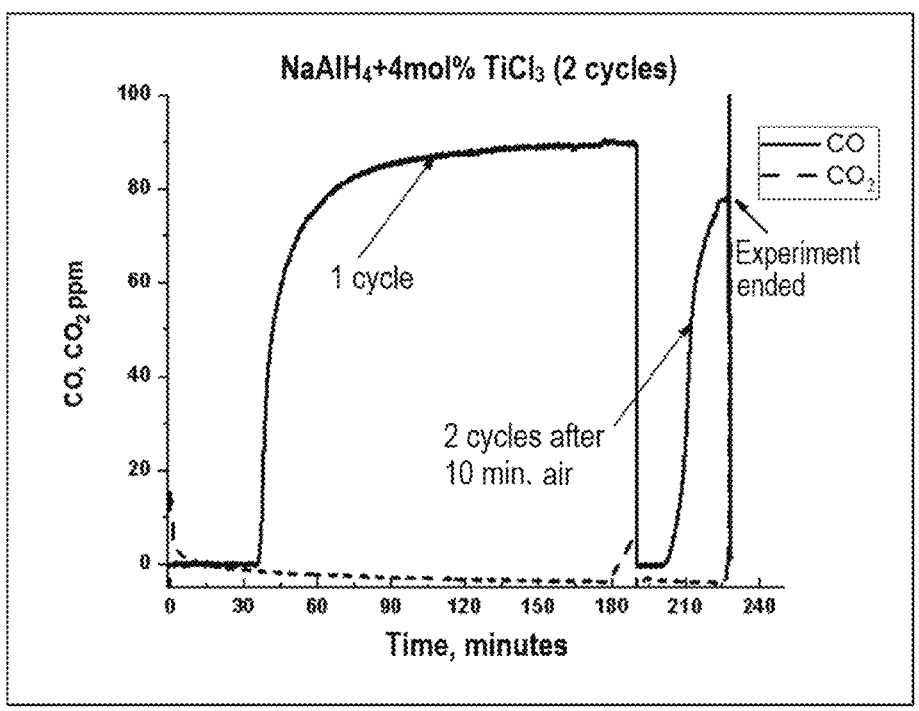

In this regard, FIG. 4 illustrates the reusability of a flow tube filled with a complex metal aluminium hydride used in the process in accordance with the invention which has undergone a step for removal of the absorbed carbon monoxide, for example by the action of ambient air on the complex metal aluminium hydride.

Figure 5:
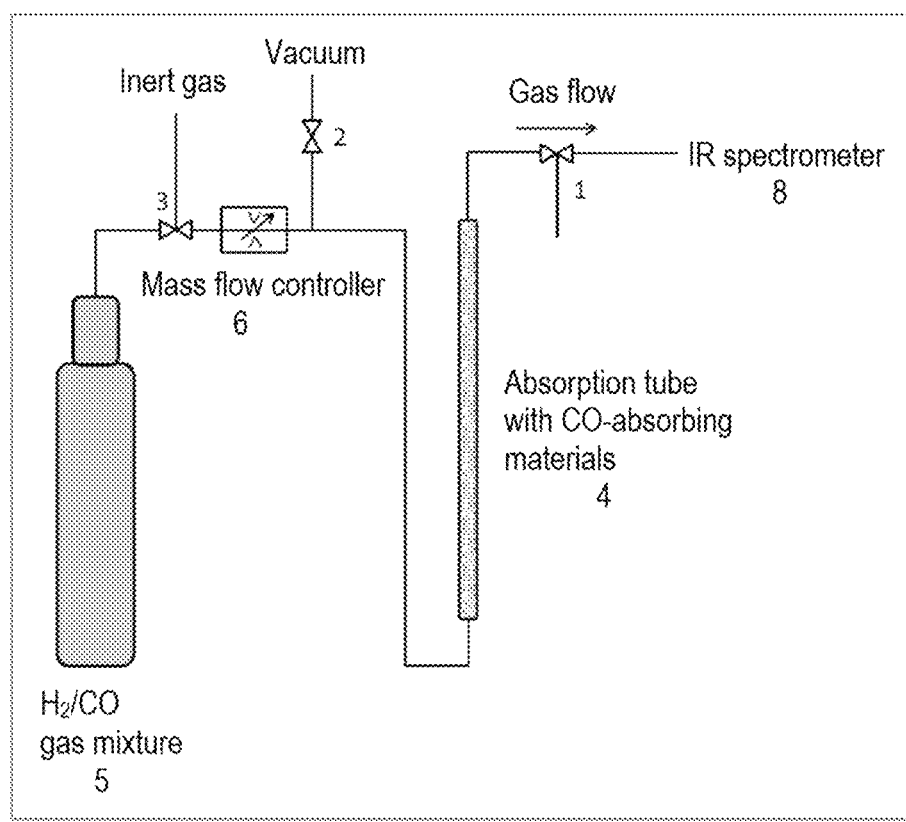

FIG. 5 shows the test apparatus and serves to explain the test procedure. As can be seen in FIG. 5, the test apparatus consists of an absorption tube 4 filled with a complex aluminium hydride, the reservoir 5 for the gas mixture employed, a mass flow controller 6, a vacuum pump 7 and an IR spectrometer 8 for monitoring the CO concentration in the gas mixture. The individual operational procedures can be carried out under inert conditions by means of the valves 1, 2 and 3.

Before starting the measurement, the entire apparatus is evacuated via the valve 2 with valves 1 and 3 closed. Next, the valve 2 is closed and the apparatus is filled with an inert gas via the valve 3. The gas mixture is supplied with the valves 1 and 3 open, wherein the gas flow is adjusted to the required quantity of gas with the aid of the mass flow controller 6. After the gas mixture has flowed through the absorption tube 4, the CO concentration is determined with the aid of the IR spectrometer 8.

A reduction in the absorption capacity of the complex aluminium hydrides upon the removal of contaminants from hydrogen gas can be made visible in a simple manner by means of a colour reaction in the window of a cartridge which is downstream in the flow direction of the absorption tube 4 and upstream of the valve 1, and thus be monitored in this manner. An example is the reaction of CO with iodine pentoxide deposited on a support in the cartridge with a window, wherein oxidation of CO occurs and iodine is formed in accordance with the following reaction:

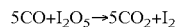

$$5CO+I_2O_5 \rightarrow 5CO_2+I_2$$

The support material on which the colour reaction occurs is coloured by the iodine that is released. In this manner, optical observation and monitoring of a diminishing absorption capacity is possible, and an exchange of the absorption tube can be carried out in a timely manner. Preferably, two or more absorption tubes 4 are disposed in parallel in the flow direction and when the absorption capacity diminishes, the gas flow can be switched from one absorption tube 4 to another.

FIG. 4 illustrates the reusability of a flow tube filled with a complex metal aluminium hydride used in the process in accordance with the invention, which has undergone a step for removing the adsorbed carbon monoxide, for example under the action of ambient air on the complex metal aluminium hydride.

Methods and Apparatus

A URAS 26 NDIR spectrometer (non-dispersive infrared spectrometer) from ABB was used to determine the CO concentration. The gas concentration was determined with the aid of a gas-filled optopneumatic detector. The particle sizes were determined either by laser diffraction, or in the case of very small particles with the aid of TEM analyses (transmission electron microscopy).

EXAMPLE OF PRODUCTION

In a typical process, $Na_3AlH_6$ was ground with $TiCl_3$ (2-4 mol %) and optional other additives in a ball mill. The material obtained in this manner was used to remove CO from hydrogen gas. Similarly, other contaminants such as $CO_2$, $H_2O$ and S compounds could be eliminated from hydrogen gas using this process.

Example 1

In a flow tube, 2.0 g of a mixture of partially dehydrogenated $Na_3AlH_6$ (composition: (1−x) $Na_3AlH_6$+3xNaH+ xAl), TiCl$_3$ (4 mol %), activated carbon (8 mol %) and Al powder (8 mol %), which had been produced by grinding in a ball mill, was perfused with hydrogen gas containing 10 ppm CO at a flow rate of 50 ml/min. After it had been perfused, IR spectroscopy was used to monitor for CO in the gas mixture, whereupon initially, no CO could be detected. After 75 h, the CO concentration had grown to 3 ppm.

Example 2

In a flow tube, 2.0 g of a mixture of Na$_3$AlH$_6$, TiCl$_3$ (4 mol %), activated carbon (8 mol %) and Al powder (8 mol %), which had been produced by grinding in a ball mill, was perfused with hydrogen gas containing 10 ppm CO at a flow rate of 3 l/h. After it had been perfused, IR spectroscopy was used to monitor for CO in the gas mixture, whereupon initially, no CO could be detected. After 46 h, the CO concentration had grown to 1.6 ppm.

Example 3

In a flow tube, 2.0 g of a mixture of Na$_3$AlH$_6$ and TiCl$_3$ (4 mol %), which had been produced by grinding in a ball mill, was perfused with hydrogen gas containing 100 ppm CO at a flow rate of 50 ml/min. After it had been perfused, IR spectroscopy was used to monitor for CO in the gas mixture. Over a time period of 60 min, no CO could be detected. In the following 50 min the CO content grew to 50 ppm.

Example 4

In a flow tube, 2.0 g of a mixture of NaAlH$_4$ and TiCl$_3$ (4 mol %), which had been produced by grinding in a ball mill, was perfused with hydrogen gas containing 100 ppm CO at a flow rate of 50 ml/min. After it had been perfused, IR spectroscopy was used to monitor for CO in the gas mixture. Over a time period of 35 min, no CO could be detected. In the following 25 min, the CO content had grown to 75 ppm.

Example 5

In a flow tube, 2.0 g of pure NaAlH$_4$ was perfused with hydrogen gas containing 100 ppm CO at a flow rate of 50 ml/min. After it had been perfused, IR spectroscopy was used to monitor for CO in the gas mixture. After 3 min, the CO content had grown to 100 ppm.

Example 6

In a flow tube, 2.0 g of a mixture of Na$_3$AlH$_6$, TiCl$_3$ (4 mol %), activated carbon (8 mol %) and Al powder (8 mol %), which had been produced by grinding in a ball mill, was perfused with hydrogen gas containing 100 ppm CO at 30° C. and a flow rate of 3 l/h. After it had been perfused, IR spectroscopy was used to monitor for CO in the gas mixture. Up to 30 min following the start of the experiment, no CO was detected. In the following 3 h, the CO content increased to 90 ppm. The flow tube was then separated from the gas flow and exposed to the ambient air for 10 minutes. After this time, hydrogen gas containing 100 ppm CO was conducted through the flow tube once again. The mixture again exhibited a high absorption capacity for CO and no CO could be detected for 15 min. After that, the CO content in the hydrogen gas once again increased continuously.

The invention claimed is:

1. A process for removing carbon monoxide from a gas containing carbon monoxide containing hydrogen gas and/or one or more gaseous aliphatic hydrocarbons or a mixture thereof, said process comprising bringing the gas into contact with a complex metal aluminium hydride in a reaction vessel, wherein the complex metal aluminium hydride is selected from the group which consists of one or more compounds of Formula I Me$^{x+}$[AlH$_4$]$^-{}_x$ with x=1-5, of Formula II Me$_y${}^{w+}$[AlH$_6$]$^{3-}{}_z$ with w·y=3z, and of Formula III Me$_p${}^{q+}$[AlH$_5$]$^{2-}$ with p·q=2r, wherein Me represents one or more alkalis or alkaline-earth metals.

2. The process as claimed in claim 1, in which the one or more complex metal aluminium hydrides of Formulae I to III are used and are reacted with one or more metals as metallic compounds, or in the form of particles, wherein as the one or more metals, one or more transition metals from groups 3, 4, 5, 6, 7, 8, 9, 10, or 11 of the Periodic Table of Elements are used, or alloys or mixtures of these metals with each other or with aluminium are used.

3. The process as claimed in claim 2, in which the the one or more metals are in the form of very small particles with a high degree of distribution, with particle sizes of approximately 0.5 to 1000 nm and/or with large specific surface areas of 50 to 1000 m$^2$/g.

4. The process as claimed in claim 2, wherein the metal compounds are metal salts.

5. The process as claimed in claim 4, wherein the metal salts are metal halides.

6. The process as claimed in claim 2, wherein the transition metals are selected from the group consisting of Sc, Ti, V, Cr, Mn, Fe, Co, Ni, Cu, Zn, Y, Zr, Nb, Mo, La, Ce, Pr and Nd.

7. The process as claimed in claim 1, in which the one or more of the complex metal aluminium hydrides of Formulae I to III are completely or partially dehydrogenated.

8. The process as claimed in claim 1, in which the one or more of the complex metal aluminium hydrides of Formulae I to III are used and to which one or more metals in the form of particles are added and the mixture obtained is ground to a particle size of 0.5 to 1000 nm, wherein the added metal or metals are selected from transition metals from groups 3, 4, 5, 6, 7, 8, 9, 10, or 11 of the Periodic Table of Elements, or alloys or mixtures thereof with each other or with aluminium.

9. The process as claimed in claim 8, in which the one or more metals in the form of particles are produced by in situ reduction with the complex metal aluminium hydride of Formulae I to III.

10. The process as claimed in claim 8, wherein the one or more metals are selected from Ti, Zr, Sc, Y, and rare earth metals.

11. The process as claimed in claim 1, in which the complex metal aluminium hydride is used and to which carbon particles selected from graphite, nodular carbon, activated carbon, or mixtures thereof have been added.

12. The process as claimed in claim 1, in which the reaction vessel is in the form of a filter unit which is filled with one or more of the complex metal aluminium hydrides of Formulae I to III as claimed in a process as used in claim 1, optionally in combination with one or more metals in the form of particles and/or in combination with carbon particles.

* * * * *